(12) United States Patent
Miwa (10) Patent No.: US 6,452,664 B2
(45) Date of Patent: Sep. 17, 2002

(54) RANGEFINDER APPARATUS

(75) Inventor: Yasuhiro Miwa, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/764,443

(22) Filed: Jan. 19, 2001

(30) Foreign Application Priority Data

Jan. 19, 2000 (JP) ........................................ 2000-010863

(51) Int. Cl.$^7$ ............................. G01C 3/00; G01C 3/08; G03B 13/00
(52) U.S. Cl. ..................... 356/3.04; 356/4.01; 396/106; 396/120
(58) Field of Search ............................... 356/5.01, 5.08, 356/4.01, 3.04; 396/106, 120

(56) References Cited

U.S. PATENT DOCUMENTS 3,947,119 A * 3/1976 Bamberg et al.
5,453,932 A * 9/1995 Brabec ........................ 356/5.01
5,926,259 A * 7/1999 Bamberger et al. ........ 356/5.01
6,026,246 A 2/2000 Yoshida et al. ............. 396/106

FOREIGN PATENT DOCUMENTS

JP 10-274524 10/1998

* cited by examiner

Primary Examiner—Stephen C. Buczinski
(74) Attorney, Agent, or Firm—Leydig, Voit & Mayer, Ltd.

(57) ABSTRACT

A rangefinder apparatus includes an infrared emitting device (IRED) for projecting a light beam toward a target object; a position sensitive detector (PSD) for detecting light of the light beam reflected from the target object and outputting an output signal corresponding to a distance to the target object; an output circuit for charging an integrating capacitor according to the output signal of the PSD and an analog-to-digital (A/D) converter for converting a voltage of the integrating capacitor after an end of a rangefinding operation including a number of light-projecting actions by the IRED, light-detecting actions by the PSD, and integrating actions by the output circuit are repeated. Multiple rangefinding operations are carried out with a different number of repetitions, and the distance is determined according to respective values obtained by A/D conversions after the rangefinding operations. Consequently, conversion errors in A/D conversions are reduced, whereby the rangefinding accuracy is improved.

4 Claims, 8 Drawing Sheets

|  | NUMBER OF EMISSIONS | INTEGRATING C VOLTAGE (mV) | A/D CONVERSION RESULT (COUNT) | A/D CONVERSION RESULT (mV) |
|---|---|---|---|---|
| 1$^{ST}$ RANGING | 107 | 1469.54 | 92 | 1473.44 |
| 2$^{ND}$ RANGING | 110 | 1510.74 | 94 | 1505.47 |
| 3$^{RD}$ RANGING | 113 | 1551.94 | 97 | 1553.52 |
| AVERAGE | 110 | 1510.74 | 94.3333 | 1510.81 |

|  | NUMBER OF EMISSIONS | INTEGRATING C VOLTAGE (mV) | A/D CONVERSION RESULT (COUNT) | A/D CONVERSION RESULT (mV) |
|---|---|---|---|---|
| 1ST RANGING | 107 | 1469.54 | 92 | 1473.44 |
| 2ND RANGING | 110 | 1510.74 | 94 | 1505.47 |
| 3RD RANGING | 113 | 1551.94 | 97 | 1553.52 |
| AVERAGE | 110 | 1510.74 | 94.3333 | 1510.81 |

Fig.6

|  | NUMBER OF EMISSIONS | INTEGRATING C VOLTAGE (mV) | A/D CONVERSION RESULT (COUNT) | A/D CONVERSION RESULT (mV) |
|---|---|---|---|---|
| 1ST RANGING | 110 | 1510.74 | 94 | 1505.47 |
| 2ND RANGING | 110 | 1510.74 | 94 | 1505.47 |
| 3RD RANGING | 110 | 1510.74 | 94 | 1505.47 |
| AVERAGE | 110 | 1510.74 | 94.0000 | 1505.47 |

RANGEFINDER APPARATUS

BACKGROUND OF THE INVENTION

1. Field of the Invention

The present invention relates to a rangefinder apparatus for measuring the distance to a target object; and, in particular, to an active type rangefinder apparatus used in a camera or the like.

2. Related Background Art

Conventionally known as an active type rangefinder apparatus used in a camera or the like is one having light-detecting means for detecting light reflected from target object and outputting near-side and far-side signals corresponding to the distance to the target object, comparing the far-side signal with a preset clamp signal in terms of magnitude, calculating an output ratio signal from the ratio between the greater signal determined by the comparison and the near-side signal, and converting the output ratio signal into a distance signal according to a converting expression varying depending on the value of output ratio signal as disclosed in Japanese Patent Application Laid-Open No. HEI 10-274524.

This rangefinder apparatus is aimed at obtaining rangefinding results on a par with those of a conventional system using both the light quantity and rangefinding in a short period of time without enhancing its circuit scale, so as to determine the distance to the target object uniquely and stably even when the distance is long.

Meanwhile, in this kind of rangefinder apparatus, output ratio signals may be computed repeatedly upon a plurality of light emitting operations, so that an integrating capacitor is charged according to these output ratio signals. In this case, an A/D conversion may be carried out in order for a CPU to process the charged voltage of integrating capacitor, so that the distance to the target object is calculated according to thus A/D-converted value.

However, there is a fear of conversion errors occurring upon an A/D conversion due to the roughness in dividing number for the A/D conversion. In a rangefinder apparatus carrying out rangefinding operations a plurality of times and taking their average as a rangefinding result, there is a fear of conversion errors upon A/D conversions being superimposed on each other so as to yield a large error.

SUMMARY OF THE INVENTION

In order to overcome such technical problems, it is an object of the present invention to provide a rangefinder apparatus which can reduce conversion errors upon A/D conversions, thereby improving its accuracy in rangefinding For achieving such an object, the present invention provides a rangefinder apparatus comprising light-projecting means for projecting a light beam toward a target object; light-receiving means for receiving reflected light of the light beam projected to the target object and outputting an output signal corresponding to a distance to the target object; integrating means for charging or discharging an integrating capacitor according to the output signal of the light-receiving means; and converting means for A/D-converting a voltage of the integrating capacitor after an end of a rangefinding operation in which a predetermined number of light-projecting actions by the light-projecting means, light-receiving actions by the light-receiving means, and integrating actions by the integrating means are repeated; wherein a plurality of rangefinding operations are carried out with a different number of repetitions therein, and the distance is detected according to respective A/D-converted values obtained by A/D conversions after the rangefinding operations.

In the rangefinder apparatus in accordance with the present invention, the number of repetitions of light-projecting actions by the light-projecting means, light-receiving actions by the light-receiving means, and integrating actions by the integrating means in each rangefinding operation may be set so as to yield a different A/D-converted value.

In the rangefinder apparatus in accordance with the present invention, the number of repetitions of light-projecting actions by the light-projecting means, light-receiving actions by the light-receiving means, and integrating actions by the integrating means in each rangefinding operation may be set so as to yield a different conversion error value in the A/D-converted value.

Since the number of repetitions differs among individual rangefinding operations in the present invention, conversion errors occurring upon A/D conversions fluctuate, whereby conversion errors can be prevented from becoming greater. As a consequence, the rangefinding accuracy can be improved.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

In the following, an embodiment of the present invention will be explained with reference to the accompanying drawings Here, constituents identical to each other among the drawings will be referred to with numerals or letters identical to each other without repeating their overlapping explanations. The sizes and proportions in the drawings do not always match those explained.

Figure 1:
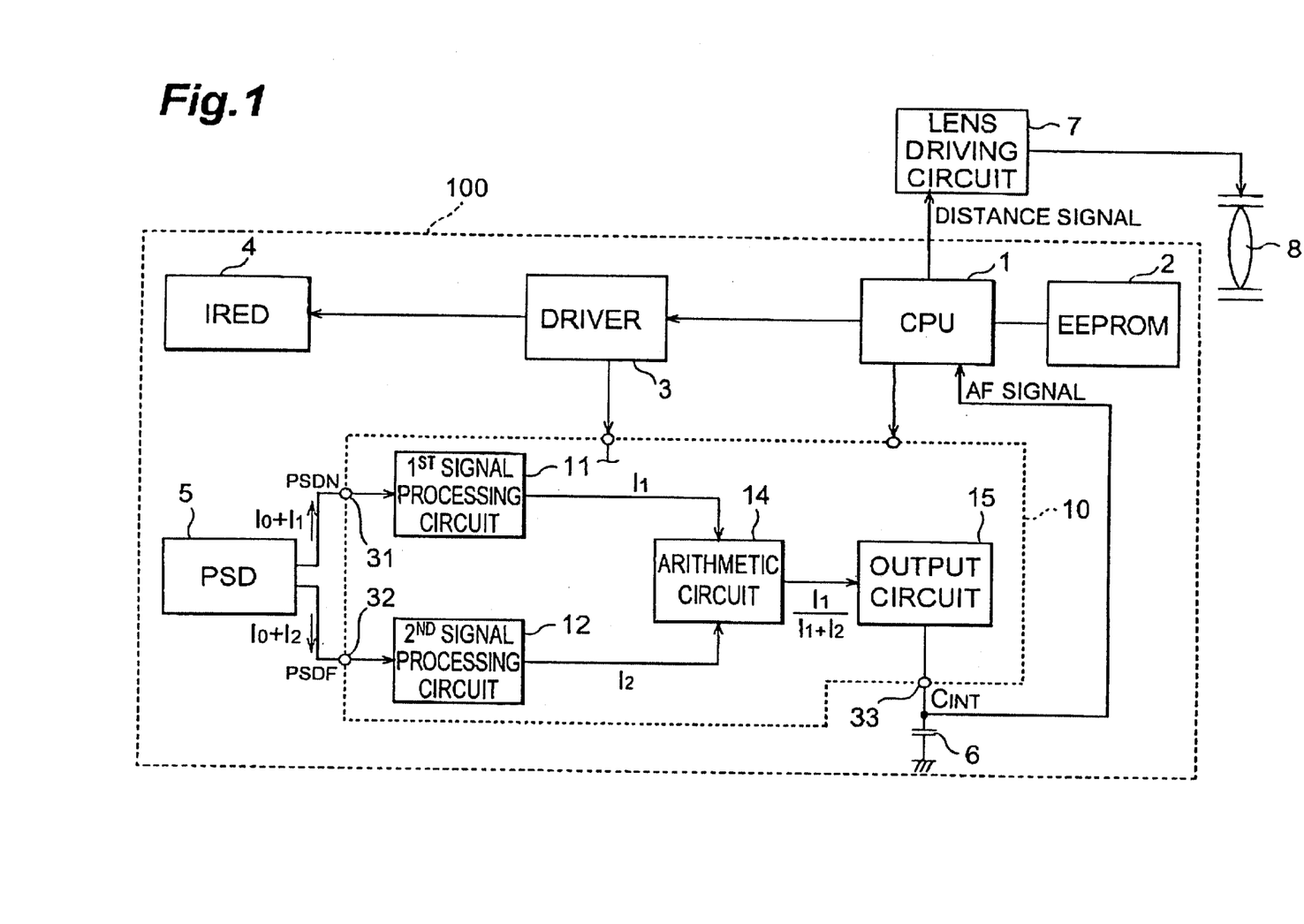
FIG. 1 is a schematic diagram of the rangefinder apparatus in accordance with an embodiment of the present invention.

FIG. 1 is a schematic diagram of the rangefinder apparatus in accordance with this embodiment.

As shown in FIG. 1, the rangefinder apparatus 100 in accordance with this embodiment comprises a CPU 1. The CPU 1 is used for controlling the whole camera equipped with the rangefinder apparatus 100. Namely, the CPU 1 controls the whole camera equipped with the rangefinder apparatus 100 according to programs and parameters which have been stored in an EEPROM 2 beforehand.

The rangefinder apparatus 100 is provided with an IRED (infrared emitting diode) 4. The IRED 4 functions as light-emitting means for projecting a light beam to a target object by emitting light. The IRED 4 is connected to the CPU 1 by way of a driver 3, so that its light emission is controlled by the CPU 1.

The driver 3 receives power supplied from a battery (not depicted) incorporated in the camera, and supplies the power, according to a control signal from the CPU 1, not only to the IRED 4 but also to camera components such as an autofocus IC (hereinafter referred to as "AFIC") 10. For example, a driver IC is used therefor.

The rangefinder apparatus 100 is also provided with a PSD (position sensing device) 5. The PSD 5 functions as light-receiving means for receiving each reflected beam of the projection light beam projected onto the target object from the IRED 4.

The rangefinder apparatus 100 further comprises the AFIC 10. The AFIC 10 functions as signal processing means for processing output signals of the PSD 5. Operations of the AFIC 10 are controlled by the CPU 1, whereas AF signals (integrated signals) outputted from the AFIC 10 are fed into the CPU 1.

When a projection light beam, which is infrared light, is emitted from the IRED 4, this beam is projected onto the target object by way of a light-projecting lens (not depicted) disposed in front of the IRED 4. A part of the projection light beam is reflected, and is received at a certain position on the light-receiving surface of PSD 5 by way of a light-receiving lens (not depicted) disposed in front of the PSD 5. This light-receiving position corresponds to the distance to the target object. Then, the PSD 5 outputs two signals $I_1$ and $I_2$ corresponding to the light-receiving position.

The signal $I_1$ is a near-side signal which attains a greater value as the distance is shorter if the quantity of received light is constant, whereas the signal $I_2$ is a far-side signal which attains a greater value as the distance is longer if the quantity of received light is constant. The sum of signals $I_1$ and $I_2$ represents the quantity of reflected light received by the PSD 5. The near-side signal $I_1$ is fed to the PSDN terminal of AFIC 10, whereas the far-side signal $I_2$ is fed to the PSDF terminal of AFIC 10. In practice, however, respective signals including a steady-state light component $I_0$ in addition to the signals $I_1$ and $I_2$ are fed into the AFIC 10 due to external conditions.

The AFIC 10 is an integrated circuit (IC) comprising a first signal processing circuit 11, a second signal processing circuit 12, an arithmetic circuit 14, and an output circuit 15.

The first signal processing circuit 11 receives the signal $I_1+I_0$ outputted from the PSD 5, eliminates the steady-state light component $I_0$ included therein, and outputs the near-side signal $I_1$. The second signal processing circuit 12 receives the signal $I_2+I_0$ outputted from the PSD 5, eliminates the steady-state light component $I_0$ included therein, and outputs the far-side signal $I_2$.

The arithmetic circuit 14 receives the near-side signal $I_1$ outputted from the first signal processing circuit 11 and the far-side signal $I_2$ outputted from the second signal processing circuit 12, calculates an output ratio $(I_1/(I_1+I_2))$, and outputs an output ratio signal representing the result thereof. This output ratio $(I_1/(I_1+I_2))$ represents the light-receiving position on the light-receiving surface of PSD 5, i.e., the distance to the target object.

The output circuit 15 receives the output ratio signal, and integrates the output ratio a number of times in cooperation with an integrating capacitor 6 connected to the $C_{INT}$ terminal of AFIC 10, thereby improving the S/N ratio. Here, the integration of output ratio to the integrating capacitor 6 is carried out as the integrating capacitor 6 in a discharged state is gradually charged according to the output ratio signal.

Then, thus integrated output ratio is outputted as an AF signal (integrated signal) from the $S_{OUT}$ terminal of AFIC 10. The CPU 1 receives the AF signal outputted from the AFIC 10, carries out a predetermined arithmetic operation so as to convert the AF signal into a distance signal, and sends out the distance signal to a lens driving circuit 7. The lens driving circuit 7 operates a taking lens 8 so as to place it in focus according to the distance signal.

Figure 2:
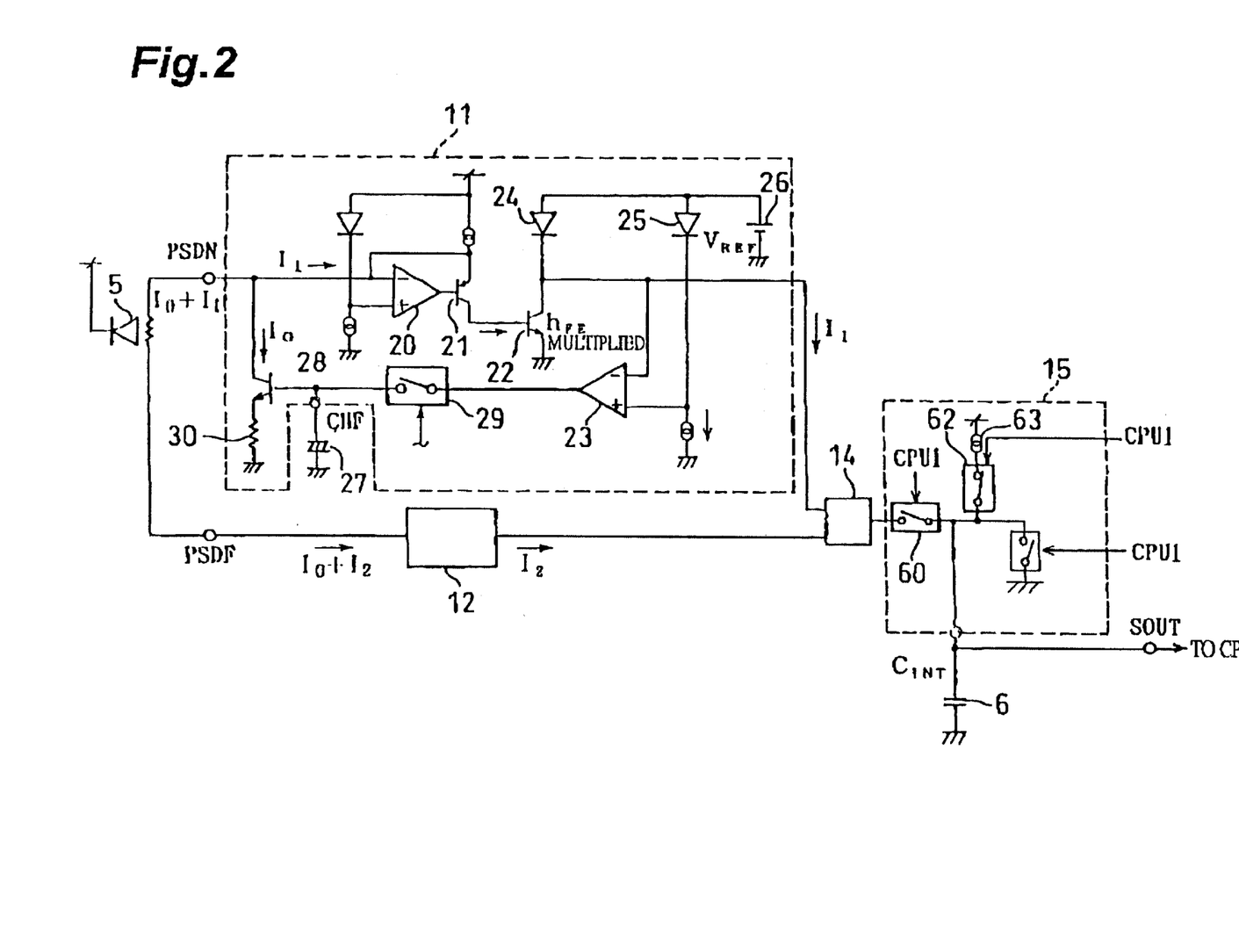
FIG. 2 is an explanatory diagram of the signal processing circuit and the like in the rangefinder apparatus of FIG. 1.

FIG. 2 is a view showing a specific configuration of the first signal processing circuit 11 and output circuit 15. The second processing circuit 12 has a circuit configuration similar to that of the first signal processing circuit 11.

As shown in FIG. 2, the first signal processing circuit 11 inputs the near-side signal $I_1$ and steady-state light component $I_0$ outputted from the PSD 5, eliminates the steady-state light component $I_0$, and outputs the near-side signal $I_1$. The current $(I_1+I_0)$ outputted from the shorter-distance-side terminal of PSD 5 is fed to the "−" input terminal of an operational amplifier 20 in the first signal processing circuit 11 by way of the PSDN terminal of AFIC 10. The output terminal of operational amplifier 20 is connected to the base terminal of a transistor 21, whereas the collector terminal of transistor 21 is connected to the base terminal of a transistor 22. The "−" input terminal of an operational amplifier 23 is connected to the collector terminal of transistor 22, and the cathode terminal of a compression diode 24 is also connected to this collector terminal. The cathode terminal of a compression diode 25 is connected to the "+" input terminal of operational amplifier 23, whereas a first reference power source 26 is connected to the respective anode terminals of compression diodes 24 and 25.

Also, a steady-state light eliminating capacitor 27 is externally attached to the CHF terminal of AFIC 10. The steady-state light eliminating capacitor 27 is connected to the base terminal of a steady-state light eliminating transistor 28 within the first signal processing circuit 11. The steady-state light eliminating capacitor 27 and the operational amplifier 23 are connected to each other by way of a switch 29, whose ON/OFF is controlled by the CPU 1. The collector terminal of steady-state light eliminating transistor 28 is connected to the "−" input terminal of operational amplifier 20, whereas the emitter terminal of transistor 28 is connected to one end of a resistor 30 whose other end is grounded.

The output circuit 15 in FIG. 2, on the other hand, comprises the integrating capacitor 6 externally attached to the $C_{INT}$ terminal of AFIC 10. The integrating capacitor 6 is connected to the output terminal of arithmetic circuit 14 by way of a switch 60 and to a constant current source 63 by way of a switch 62, and is grounded by way of a switch 64. The switches 60, 62, and 64 are controlled by control signals from the CPU 1. If the switch 62 is turned on, then the integrating capacitor 6 can be charged with the constant current source 63. If the switch 64 is turned on, by contrast, then the integrating capacitor 6 can be discharged.

Operations of the rangefinder apparatus in accordance with this embodiment will now be explained.

Figure 3:
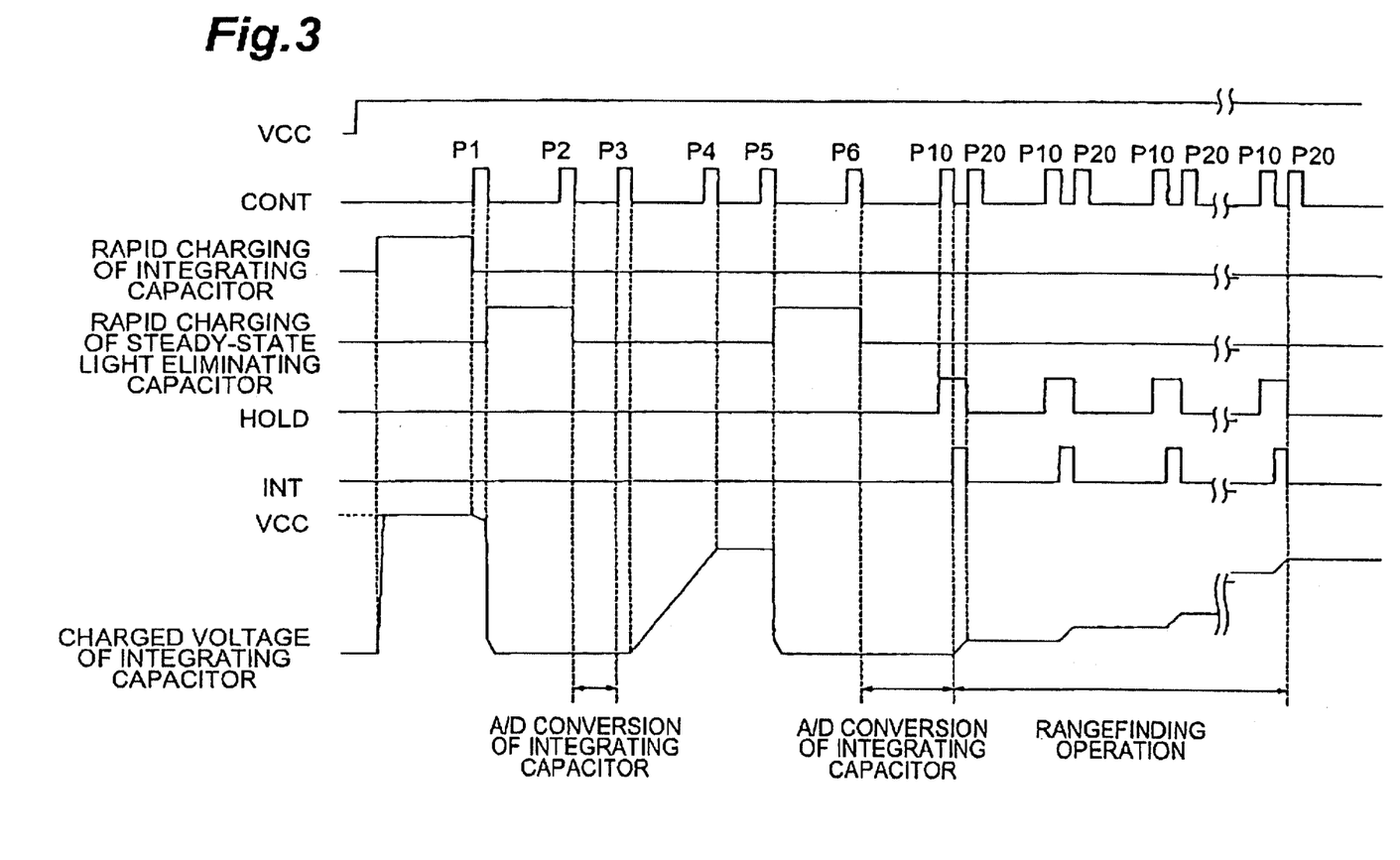
FIG. 3 is a timing chart concerning operations of the rangefinder apparatus of FIG. 1.
Figure 4:
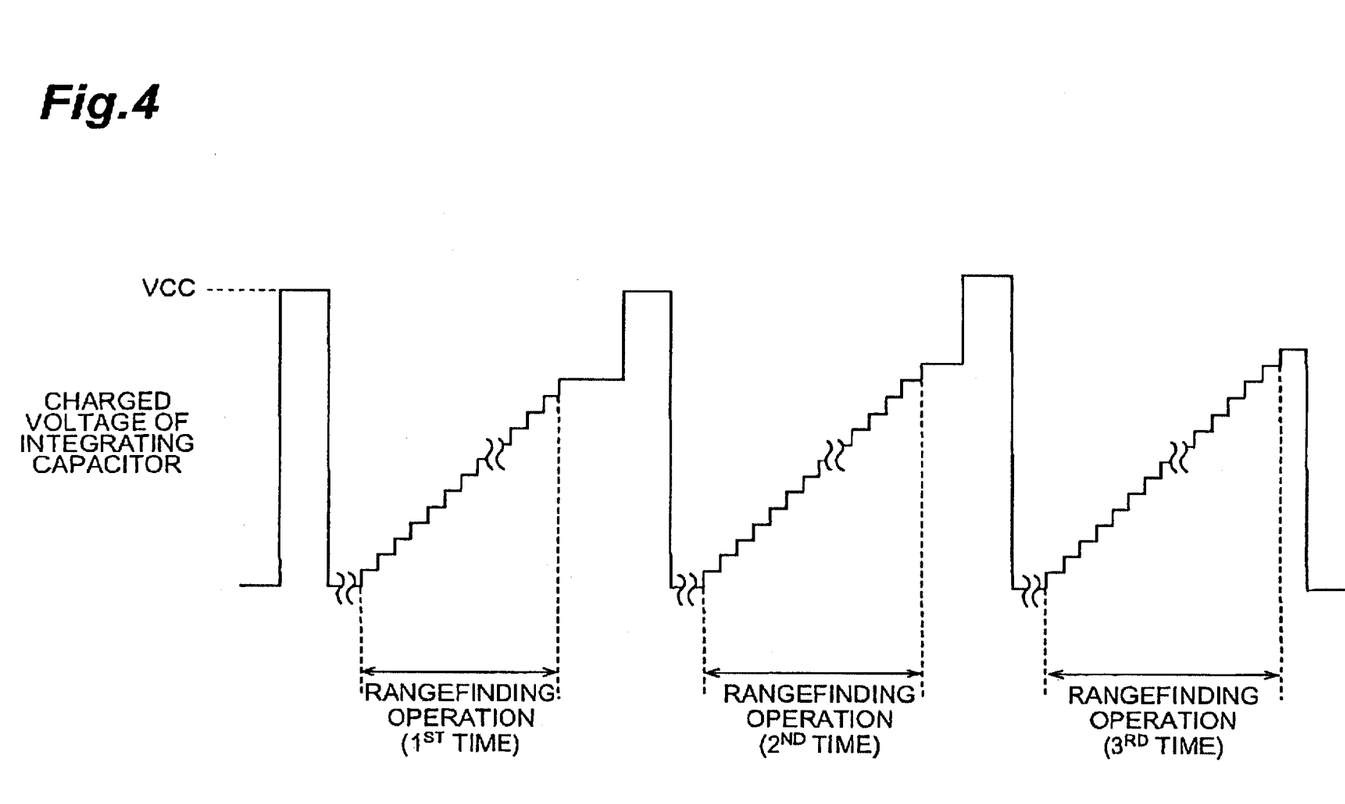
FIG. 4 is an explanatory chart of the voltage of an integrating capacitor during operations of the rangefinder apparatus.

FIG. 3 is a timing chart concerning operations of the rangefinder apparatus, whereas FIG. 4 shows the charged voltage of integrating capacitor during operations of the rangefinder apparatus.

Upon a camera operation such as shutter release, control processing for a rangefinding routine is started, whereby control processing operations are successively carried out according to a control signal. The control signal is a signal fed from the CPU 1 to the CONT terminal of AFIC 10, and is constituted by six leading pulses (P1 to P6) and their subsequent pulses (P10, P20) for an integrating action as indicated at CONT in FIG. 3.

When the power supply from the driver 3 to the AFIC 10 is started, the integrating capacitor 6 is rapidly charged in response to the power supply. At the falling edge of pulse P1 in the control signal, the rapid charging of integrating capacitor 6 is terminated, and the integrating capacitor 6 is discharged.

Then, at the falling edge of pulse P3 in the control signal, an integration for correction is carried out. The integration for correction is carried out by causing a constant current to flow through the integrating capacitor 6 for a predetermined period of time. The integration for correction ends at the falling edge of pulse P4 in the control signal.

The charging voltage of the integrating capacitor 6 is A/D-converted, and the resulting value is read into the CPU 1. CPU 1 calculates the capacity of the integrating capacitor 6 from the A/D-converted voltage value. The correction of the rangefinding results according to the calculated actual capacity improves the rangefinding accuracy.

The input of pulse P5 causes the integrating capacitor 6 to be discharged.

During a period of time from the rising edge of pulse P10 to the rising edge of pulse P20 in the control signal, the charging/discharging of steady-state light eliminating capacitor 27 is held. During a period of time from the falling edge of pulse P10 to the rising edge of pulse P20 in the control signal, the switch 60 is kept ON, so that the integrating capacitor 6 is charged according to the output ratio signal.

When the pulses P10, P20 of the control signal are inputted, one light-projecting action is carried out by the IRED 4, and the integrating capacitor 6 is charged accordingly. As the pulses P10, P20 of the control signal are repeatedly inputted, the integrating capacitor voltage rises.

When a predetermined number of light-projecting actions are carried out by the IRED 4 as shown in FIG. 4, the integrating capacitor 6 is once charged to $V_{cc}$ and is subsequently discharged, and a rangefinding operation is carried out thereafter. Here, "rangefinding operation" refers to an operation in which a predetermined number of light-projecting actions by the IRED 41 light-receiving actions by the PSD 5, and discharging actions to the integrating capacitor 6 are repeated. A plurality of rangefinding operations are carried out in one rangefinding routine. For example, the number of rangefinding operations is 3.

Here, the number of repetitions of light-projecting actions by the IRED 4, light-receiving actions by the PSD 5, and discharging actions to the integrating capacitor 6 differs among individual rangefinding operations. Letting N1 be the number of repetitions in the first operation, N2 be that in the second operation, and N3 be that in the third operation, N1, N2, and N3 are set to 107, 110, and 113, for example.

Also, it is desirable that the number of repetitions be set such that the A/D-converted value obtained upon A/D conversion (analog-to-digital conversion) of the charged voltage after the rangefinding operation varies.

It is further desirable that the number of repetitions be set such that the conversion error in the A/D-converted value yields a different value.

At the end of each rangefinding operation, the charged voltage of integrating capacitor 6 is A/D-converted, and the resulting value is read into the CPU 1. After the completion of all the rangefinding operations, the distance to the target object is calculated according to the respective A/D-converted values of charged voltage of integrating capacitor 6 in the individual rangefinding operations. In each rangefinding operation, the integrating action of integrating capacitor 6 may also be carried out by charging the integrating capacitor 6 with a predetermined voltage beforehand and then repeatedly discharging a voltage corresponding to the output ratio signal.

Actual rangefinding results of the rangefinder apparatus in accordance with this embodiment will now be explained.

Figure 5:
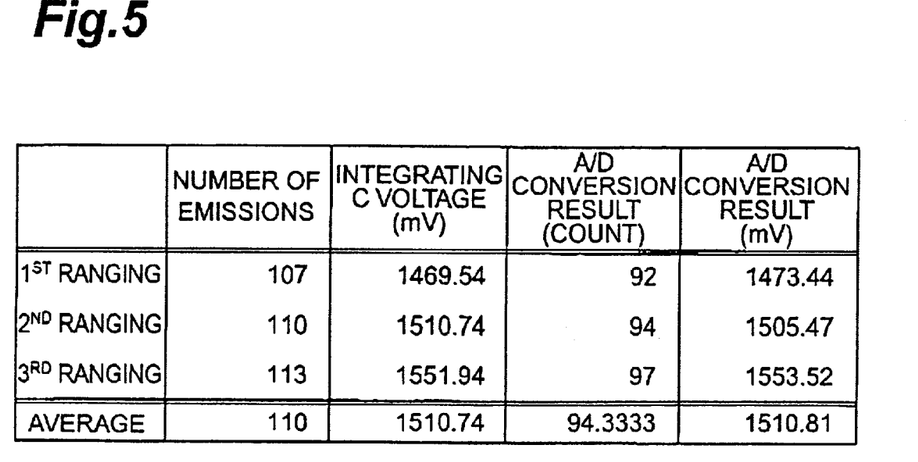
FIG. 5 is an explanatory chart of rangefinding results in the rangefinder apparatus in accordance with the embodiment.
Figure 6:
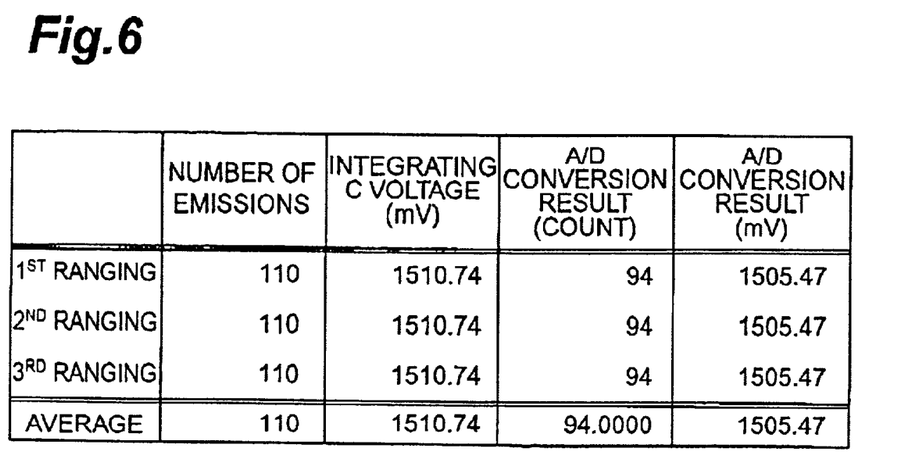
FIG. 6 is an explanatory chart of rangefinding results in the rangefinder apparatus in a case where the number of repetitions is made constant among individual rangefinding operations.

FIG. 5 shows rangefinding results of the rangefinder apparatus in accordance with this embodiment. FIG. 6 shows rangefinding results obtained when the number of repetitions (number of light emissions) is held constant among the individual rangefinding operations. FIGS. 5 and 6 show rangefinding results in the case where the distance from the rangefinder apparatus to the target object is 907 mm, and the A/D conversion is carried out while the dividing number for A/D conversion is set to 256. Though the voltage value of integrating capacitor 6 is continuous, the A/D conversion result takes discrete values.

In the rangefinder apparatus in accordance with this embodiment, as shown in FIG. 5, the numbers of repetitions in the first, second, and third rangefinding operations are 107, 110, and 113, respectively, so as to carry out rangefinding operations with their numbers of repetitions different from each other.

As a consequence, the voltage values of integrating capacitor (integrating C) after the first, second, and third rangefinding operations are 1469.54 mV, 1510.74 mV, and 1551.94 mV, respectively, thus differing from each other and yielding an average voltage value of 1510.74 mV. Also, the respective count numbers of A/D-converted values of voltage values (A/D conversion results) differ from each other among the first to third operations. However, the average voltage value of integrating capacitor 6 calculated backward from the average value of A/D-converted values is 1510.81 mV, thus hardly generating an error with respect to the actual average voltage value of integrating capacitor.

In the case where rangefinding is carried out while the number of repetitions is set to 110 in each of the first to third rangefinding operations as shown in FIG. 6, by contrast, the voltage value of integrating capacitor (integrating C) after the rangefinding operations is 1510.74 mV for all of the first to third operations. Also, the count number of A/D-converted value of voltage value (A/D conversion result) is 94 in each of the first to third operations. The average voltage value of integrating capacitor 6 calculated backward from the A/D converted value is 1505.47 mV, which yields an error of 5.27 mv with respect to the actual integrating capacitor average voltage value of 1510.74 mV.

Figure 7:
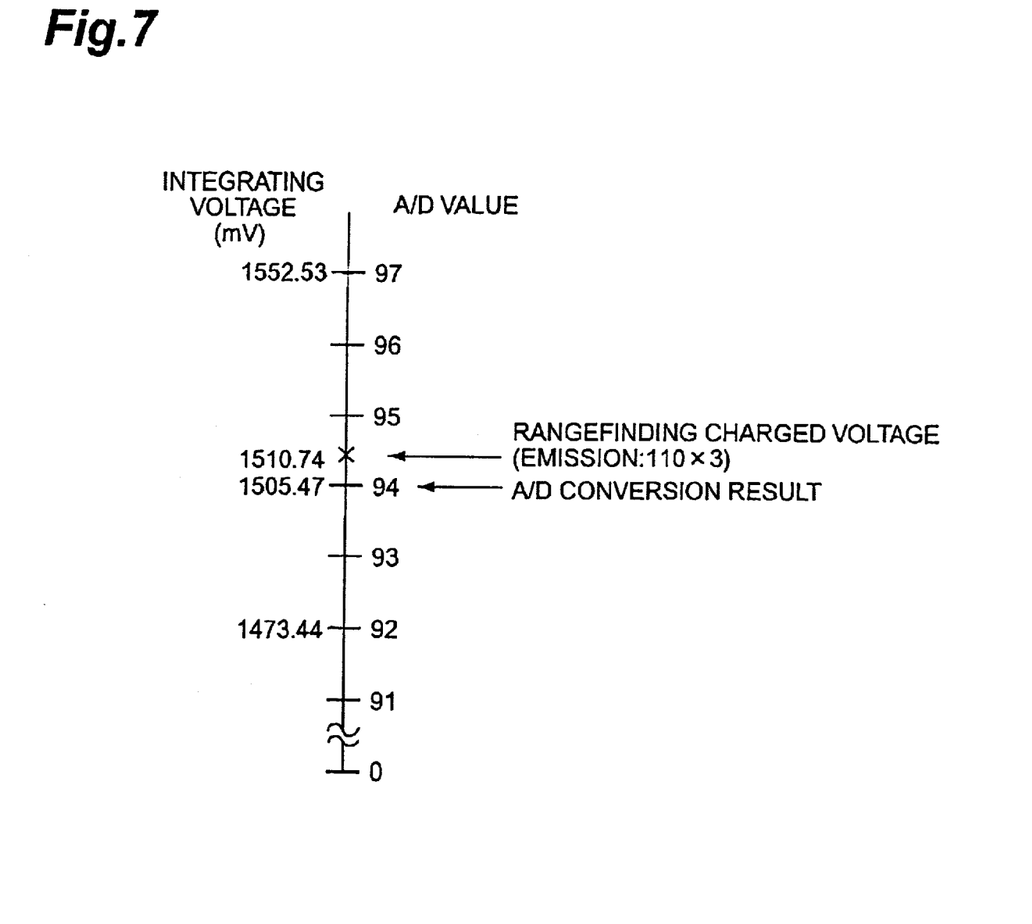
FIG. 7 is an explanatory chart of rangefinding errors in the rangefinder apparatus in the case where the number of repetitions is made constant among individual rangefinding operations.

As shown in FIG. 7, this error occurs because of the fact that, if the number of repetitions (number of light emissions) is held constant among individual rangefinding operations, then errors caused by A/D conversions cannot be reduced and will be superimposed on the rangefinding results as they are.

Figure 8:
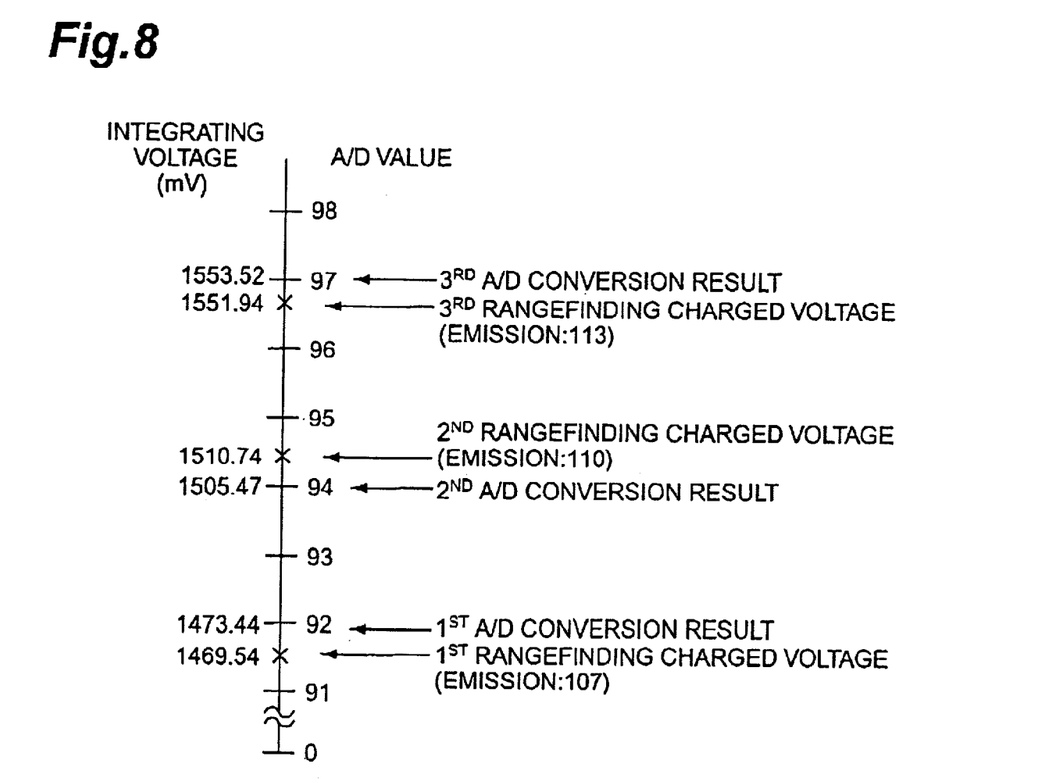
FIG. 8 is an explanatory chart of rangefinding errors in the rangefinder apparatus in accordance with the embodiment.

In the case where the number of repetitions differs among individual rangefinding operations as in the rangefinder apparatus in accordance with this embodiment as shown in FIG. 8, by contrast, errors upon A/D conversions appropriately fluctuate and cancel each other, whereby the errors are prevented from being superimposed on each other and yielding a large error.

In the rangefinder apparatus in accordance with this embodiment, as in the foregoing, the number of repetitions differs among individual rangefinding operations, so that conversion errors occurring upon A/D conversions fluctuate, whereby the conversion errors can be prevented from becoming greater. Consequently, the rangefinding accuracy can be improved.

Figure 9:
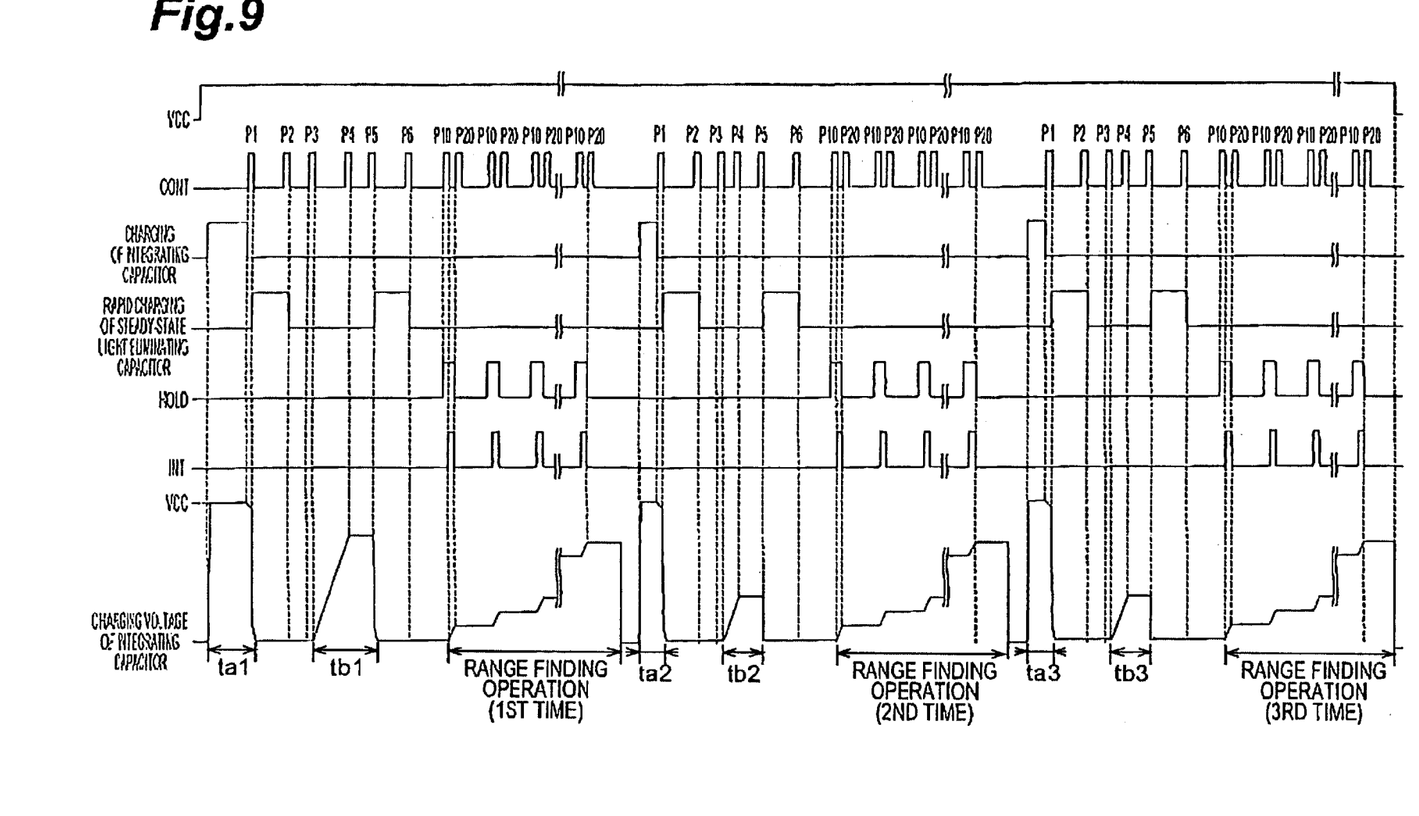
FIG. 9 is a timing chart concerning operations of the rangefinder apparatus of FIG. 1.

Incidentally, in this embodiment, as shown in FIG. 9, when the rangefinding operations are carried out multiple times, charging times ta2, ta3 of integrating capacitor 6 in the second and later rangefinding operation are desirably shorter than charging time ta1 of integrating capacitor 6 in the first rangefinding operation.

Further, times tb2, tb3 of integration for correction in the second and later rangefinding operations are desirably shorter than time tb1 of integration for correction in the first rangefinding operation.

As in the foregoing, by shortening the charging time and the integrating time for correction in the second and later rangefinding operations, the rangefinder apparatus in accordance with this embodiment can reduce the time required for rangefinding and decrease a time lag.

When the rangefinding operations are carried out multiple times, the results of the first integration for correction can be used during the second and later rangefinding operations. Consequently correction integration during the second and later rangefinding operations may be omitted. In the rangefinder apparatus in accordance with this embodiment, control processing operations are carried out according to pulses in the control signal, therefore time for integration for correction in the second and later rangefinding operations is reduced The rapid charging (charging at a time ta1 in FIG. 9) of the integrating capacitor 6 in the first rangefinding operation reduces the dielectric absorption of integrating capacitor 6. Consequently the second and later rangefinding operations may omit the rapid charging step. In the rangefinder apparatus in accordance with this embodiment, control processing operations are carried out according to pulses in the control signal, therefore time for rapid charging in the second and later rangefinding operations is reduced.

As explained in the foregoing, since the number of repetitions differs among individual rangefinding operations in the present invention, conversion errors occurring upon A/D conversions fluctuate, whereby the conversion errors can be prevented from becoming greater. Consequently, the rangefinding accuracy can be improved.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A rangefinder apparatus comprising:

light-projecting means for projecting a series of light pulses toward a target object located at a distance to be determined in a rangefinding routine;

light-detecting means for detecting reflected light pulses of the series of light pulses projected and reflected from the target object in the rangefinding routine and outputting an output signal corresponding to the distance to the target object;

integrating means for charging or discharging an integrating capacitor according to the output signal of said light-detecting means in the rangefinding routine;

analog-to-digital (A/D) converting means for converting a voltage on said integrating capacitor upon ending of the rangefinding routine to a digital value; and control means controlling said light-projecting means, said light-detecting means, and said integrating means in a rangefinding operation and determining the distance to the target object upon completion of the rangefinding operation, each rangefinding operation including sequential execution of a plurality of rangefinding routines, wherein each of the rangefinding routines in a rangefinding operation includes emission and detection of a respective, different number of light pulses, and said control means determines the distance to the target object by averaging the respective digital values produced by said A/D converting means in each of the rangefinding routines of the rangefinding operation.

2. The rangefinder apparatus according to claim 1, wherein said light-projecting means projects infrared light toward the target object.

3. The rangefinder apparatus according to claim 1, wherein said light-detecting means is a position sensing device.

4. The rangefinder apparatus according to claim 1, wherein said rangefinder apparatus is disposed in a camera.

* * * * *